(12) United States Patent
Ryshavy et al.

(10) Patent No.: US 7,850,183 B1
(45) Date of Patent: Dec. 14, 2010

(54) ADJUSTABLE SUSPENSION LEVELING APPARATUS

(75) Inventors: John W. Ryshavy, Wayzata, MN (US); James R. Ryshavy, Eden Prairie, MN (US); William E. Ingalls, Atascadero, CA (US)

(73) Assignee: Stempf Automotive Industries. Inc., Minnetonka, MN (US)

( * ) Notice: Subject to any disclaimer, the term of this patent is extended or adjusted under 35 U.S.C. 154(b) by 0 days.

(21) Appl. No.: 12/848,263

(22) Filed: Aug. 2, 2010

Related U.S. Application Data

(62) Division of application No. 12/425,809, filed on Apr. 17, 2009, now Pat. No. 7,780,178, which is a division of application No. 11/827,125, filed on Jul. 10, 2007, now Pat. No. 7,537,225.

(60) Provisional application No. 60/806,873, filed on Jul. 10, 2006.

(51) Int. Cl.
 *B60G 15/00* (2006.01)
(52) U.S. Cl. .................. 280/124.147; 280/124.155; 280/124.1; 280/6.157
(58) Field of Classification Search ............. 280/124.1, 280/6.157, 124.155, 124.147; 267/220, 221
See application file for complete search history.

(56) References Cited

U.S. PATENT DOCUMENTS

| | | | |
|---|---|---|---|
| 3,954,257 A * | 5/1976 | Keijzer et al. ............ 267/64.21 |
| 4,647,069 A | 3/1987 | Iijima | |
| 4,721,325 A * | 1/1988 | Mackovjak et al. ... 280/124.155 |
| 5,080,388 A | 1/1992 | Berry et al. | |
| 5,135,203 A * | 8/1992 | Wijnhoven et al. ....... 267/64.21 |
| 5,967,536 A | 10/1999 | Spivey et al. | |
| 6,161,822 A * | 12/2000 | Hurst et al. ............... 267/220 |
| 6,260,835 B1 * | 7/2001 | Angles et al. ............... 267/220 |
| 6,293,572 B1 * | 9/2001 | Robbins et al. ....... 280/124.155 |
| 6,328,321 B1 * | 12/2001 | Nolan ................ 280/86.754 |
| 6,382,645 B1 * | 5/2002 | Gravelle et al. ........ 280/86.754 |
| 6,827,184 B1 * | 12/2004 | Lin ..................... 188/321.11 |
| 6,843,352 B2 * | 1/2005 | Jacoby et al. .......... 188/321.11 |
| 6,923,461 B2 | 8/2005 | Momose et al. | |
| 6,957,806 B2 * | 10/2005 | Tubbs ........................ 267/34 |
| 6,986,519 B2 * | 1/2006 | Smith ................. 280/124.128 |
| 7,284,644 B2 * | 10/2007 | Cmich et al. ........... 188/321.11 |
| 7,513,514 B1 | 4/2009 | Schlosser et al. | |
| 2004/0089990 A1 * | 5/2004 | Labeau ..................... 267/220 |

* cited by examiner

*Primary Examiner*—Paul N Dickson
*Assistant Examiner*—Nicole Verley
(74) *Attorney, Agent, or Firm*—Haugen Law Firm PLLP

(57) ABSTRACT

A suspension height modification apparatus includes a first portion that is securable to a vehicular biasing suspension device and a second portion that is securable to a vehicular frame. The apparatus includes an axis along which a suspension height may be determined between the vehicular frame and the vehicular wheel assembly. The apparatus includes a movable portion which may be actuated along such axis to adjust suspension height, and a spacer device connectable between an upper ball joint stud and a steering knuckle.

9 Claims, 13 Drawing Sheets

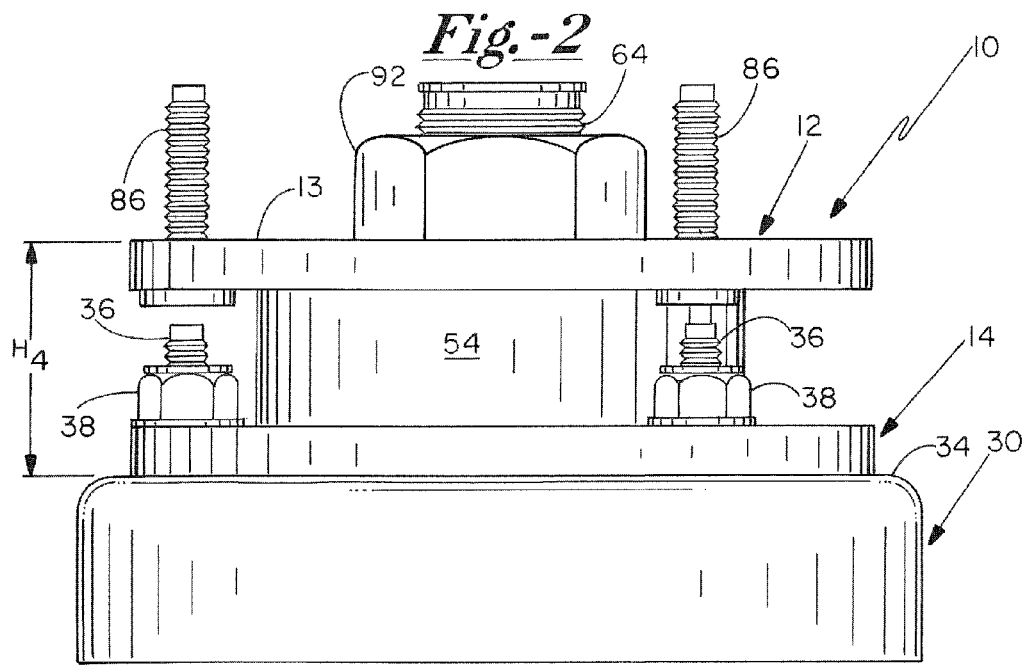
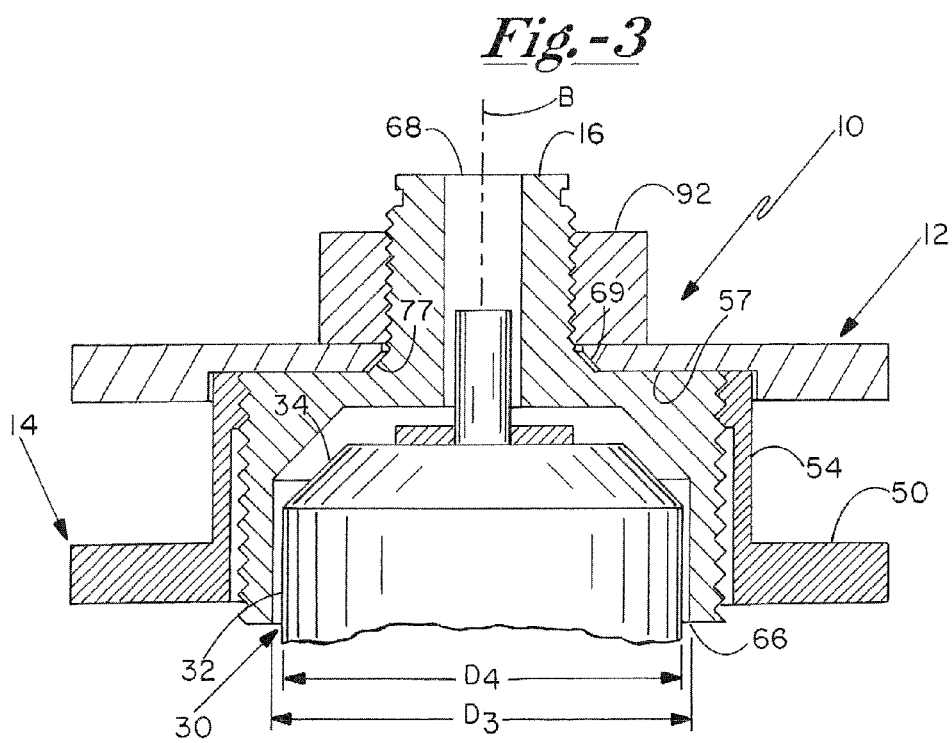

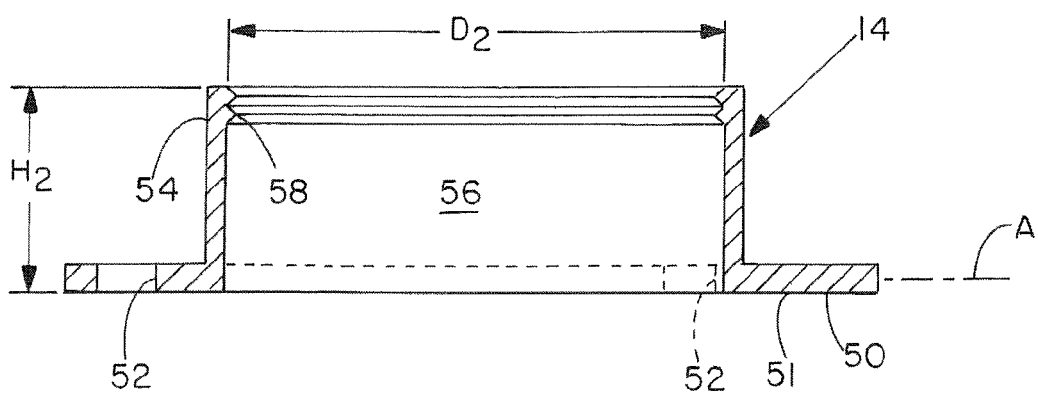
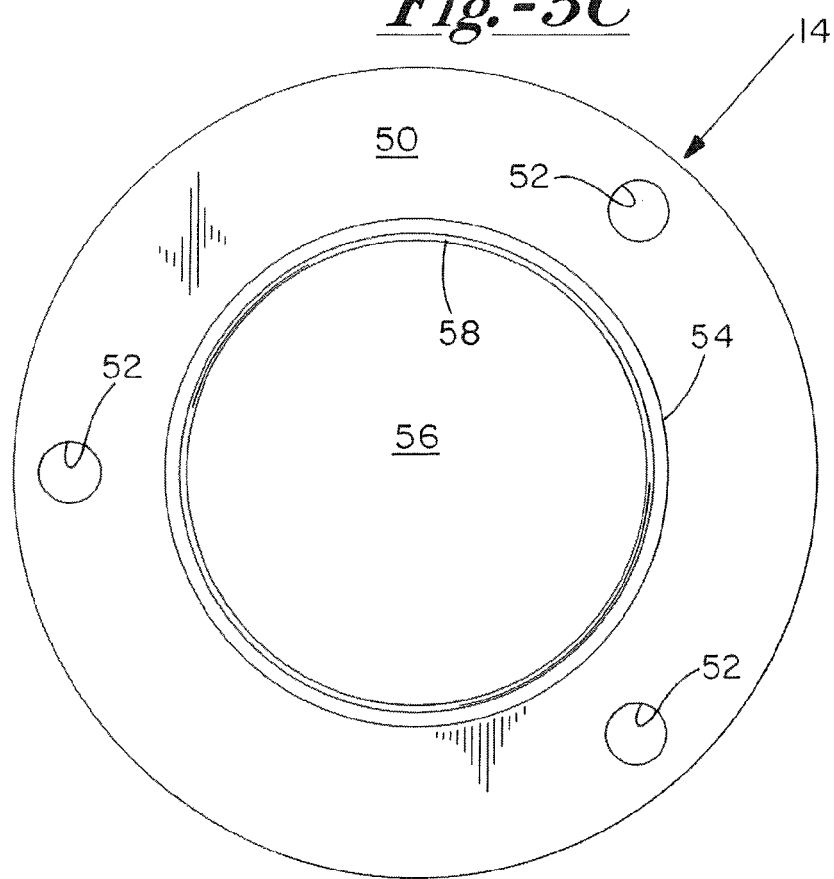

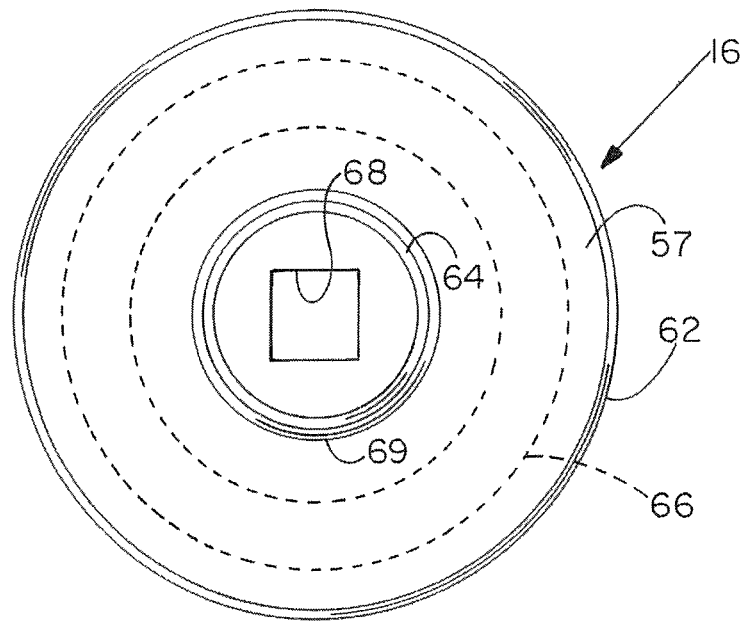
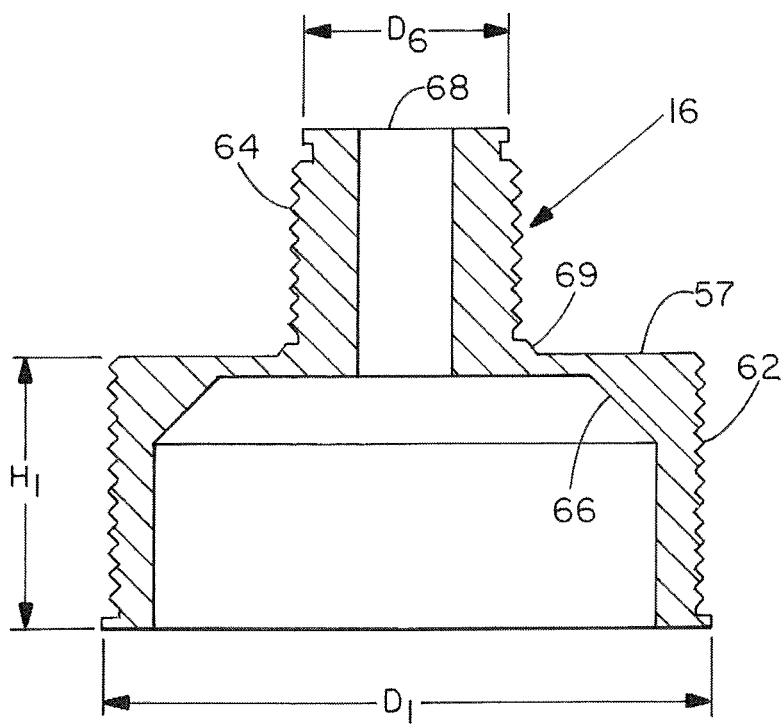

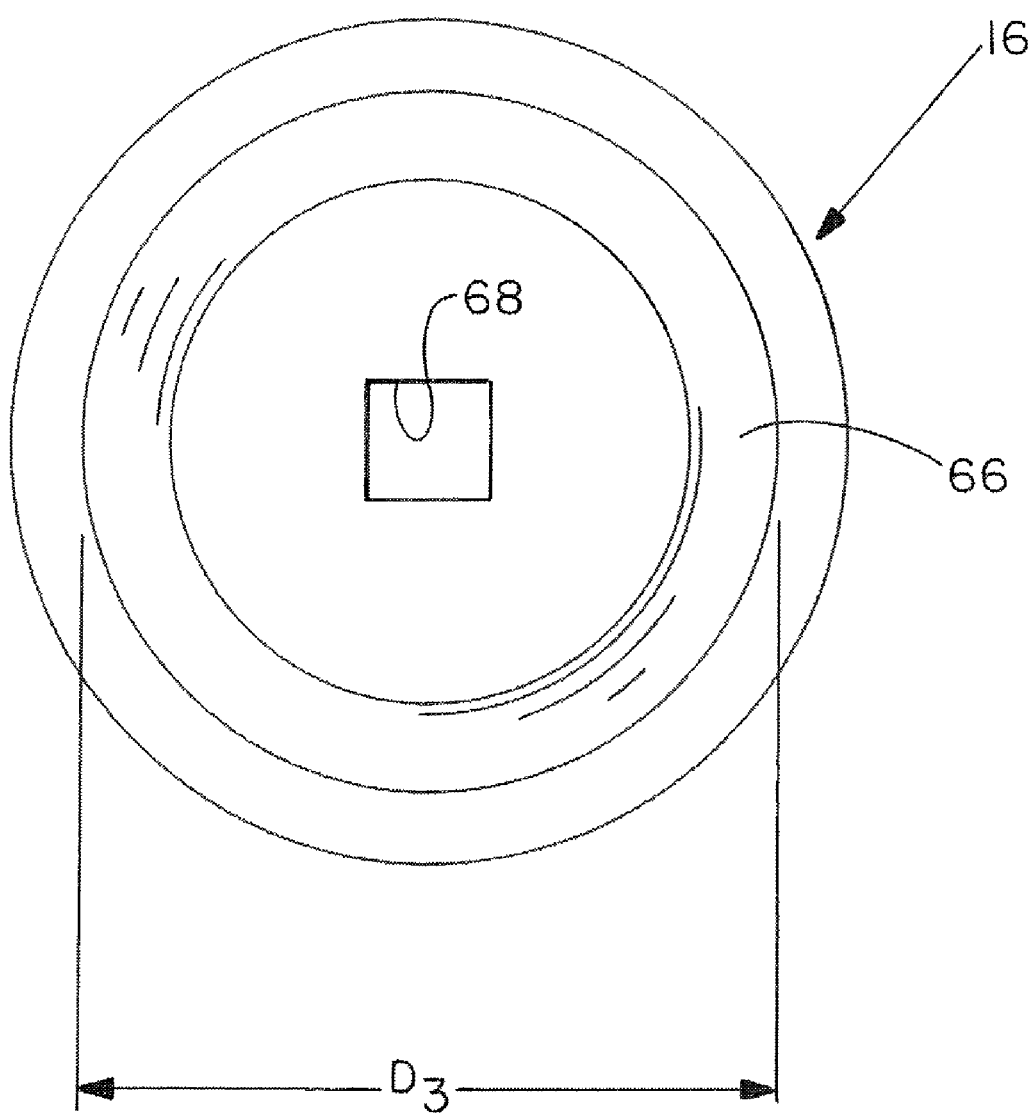

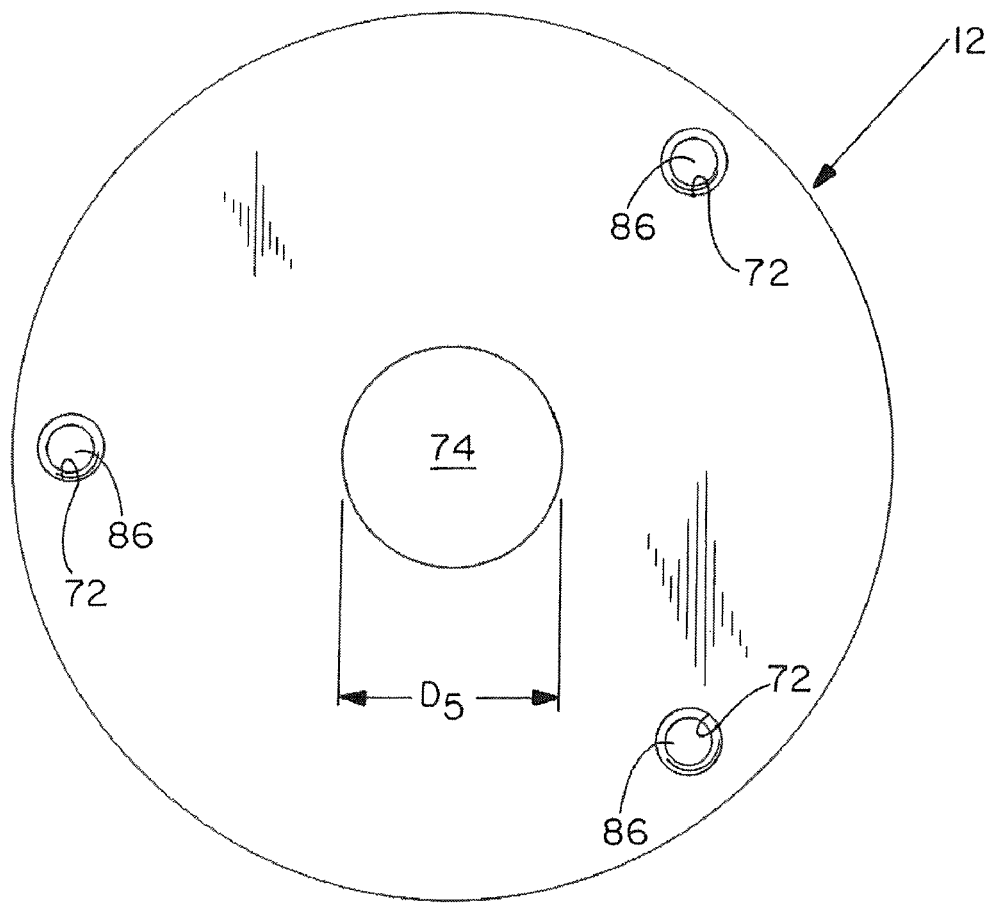
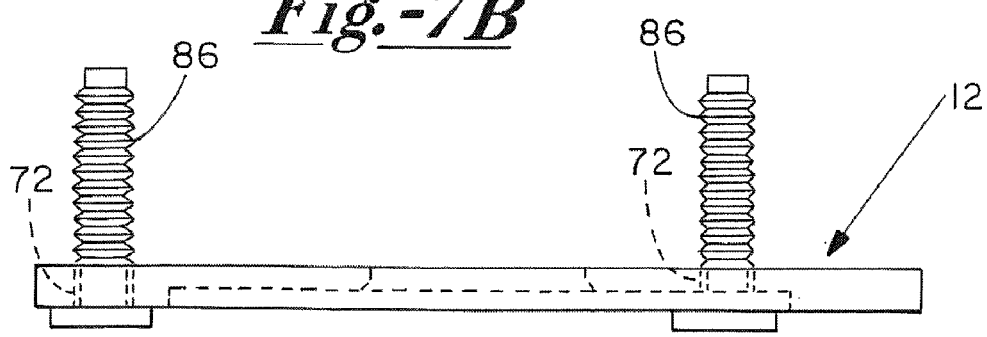

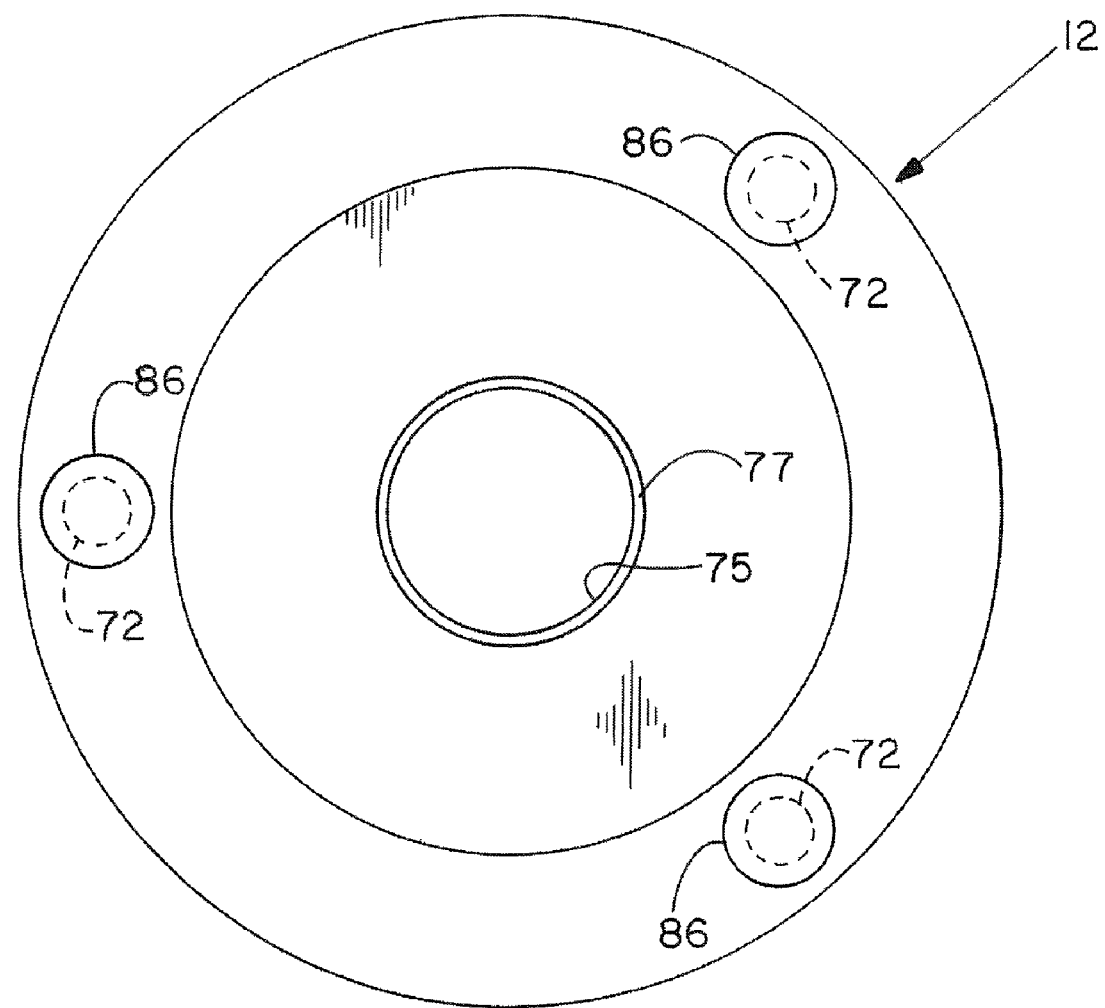

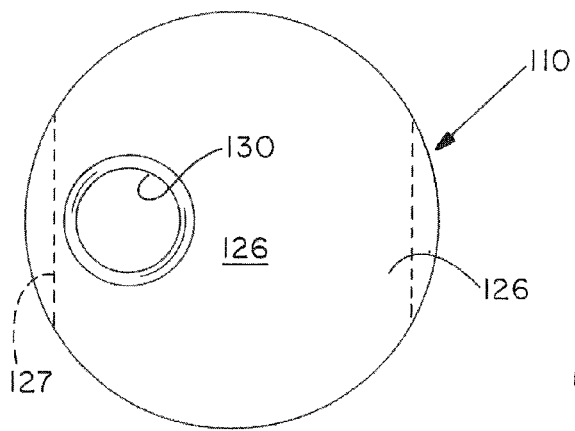
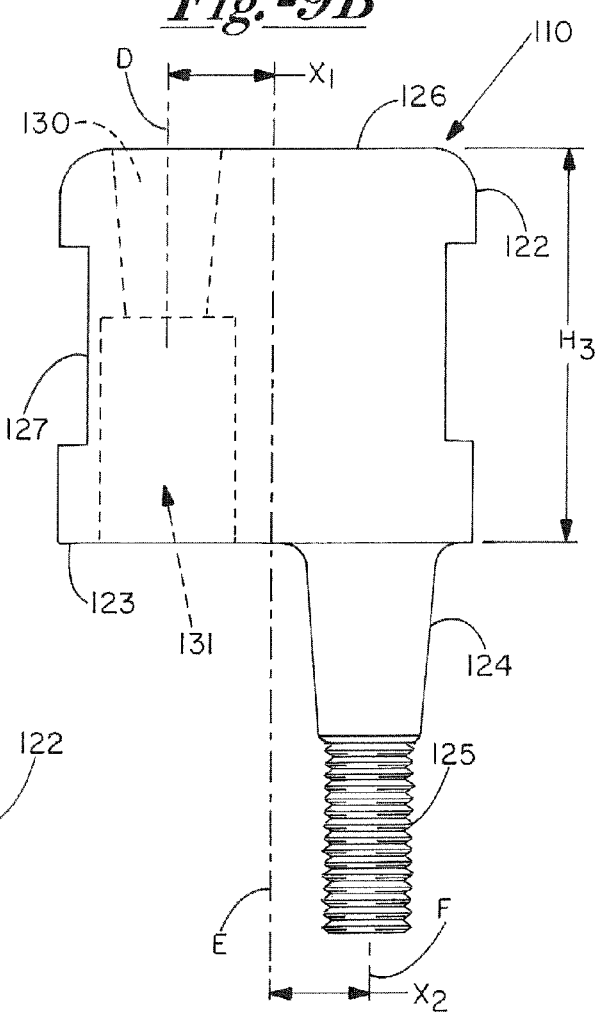
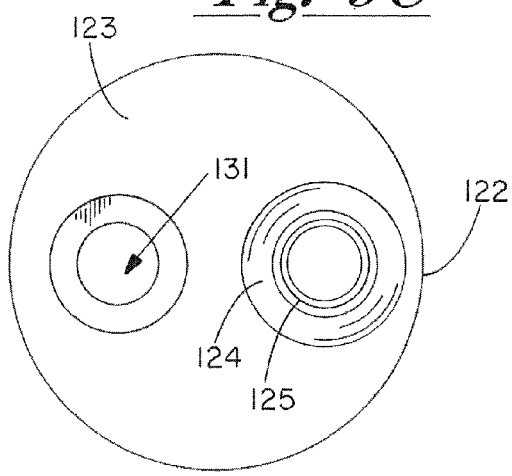

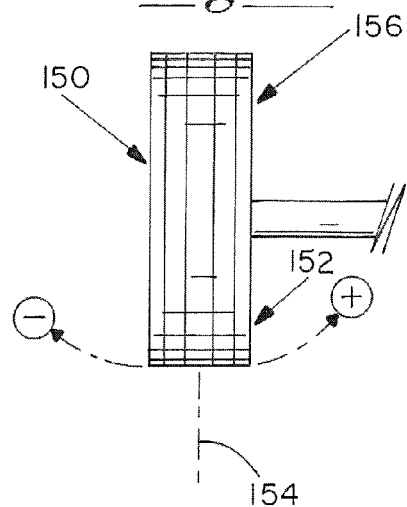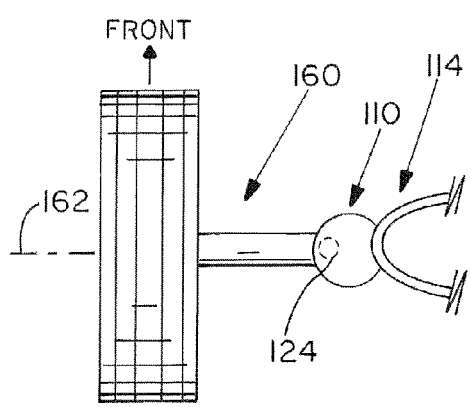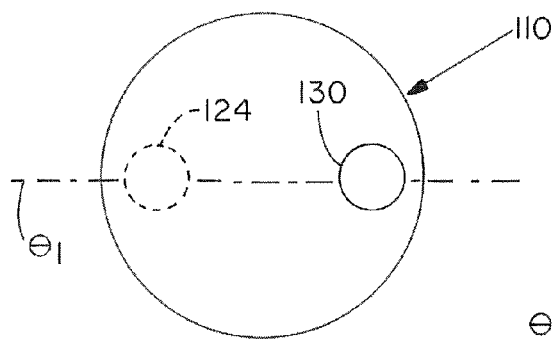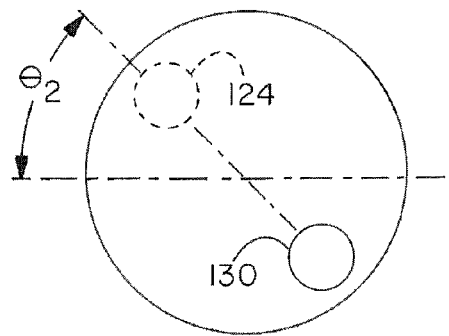

ADJUSTABLE SUSPENSION LEVELING APPARATUS

CROSS-REFERENCE TO RELATED APPLICATIONS

This application is a divisional of U.S. Non-Provisional application Ser. No. 12/425,809, filed on Apr. 17, 2009 now U.S. Pat. No. 7,780,178 and entitled "Adjustable Suspension Leveling Apparatus", which is itself a divisional of U.S. Non-Provisional application Ser. No. 11/827,125, filed on Jul. 10, 2007 now U.S. Pat. No. 7,537,225 and entitled "Adjustable Suspension Leveling Apparatus", which application claims priority to U.S. Provisional Application Ser. No. 60/806,873, filed on Jul. 10, 2006 and entitled "Adjustable Suspension Leveling Apparatus", the contents of which being incorporated herein in their entirety.

FIELD OF THE INVENTION

The present invention relates to automotive suspension systems generally, and more particularly to apparatus and methods for adjustably modifying automotive suspension characteristics, such as suspension ride height and wheel alignment.

BACKGROUND OF THE INVENTION

Automotive suspension systems in use today incorporate a variety of arrangements to best suit the intended applications. An automotive suspension arrangement that has become popular is a strut assembly, which typically involves a coil spring mounted over a shock-absorbing piston. The coil spring and shock absorber are mounted in a strut assembly between upper and lower strut housings. Such strut assemblies are positioned to extend between the wheel assemblies and the vehicle frame, so as to insulate movement of the wheel assembly from the vehicle frame.

In some instances, vehicle owners wish to modify the height of the vehicle frame with respect to its wheels. For example, certain vehicles, such as light-duty trucks, are originally equipped with a suspension that elevates the rear of the vehicle to a greater extent than the front, so as to accommodate for a level vehicle upon loads being placed at the rear end of the vehicle. In such arrangements, some vehicle owners wish to "pre-level" the suspension by raising the front of the vehicle frame to match the extent of vehicle lift provided by the manufacturer at the rear. Such raising of the front suspension of a vehicle is commonly referred to as "suspension leveling". Other applications for raising the suspension height of a vehicle include vehicle owners who simply wish to raise the height of the vehicle frame relative to the wheels for ground clearance or aesthetic purposes.

Devices for effectuating such suspension height modification include static spacers of fixed dimension that are typically placed between the top of the strut assembly and the vehicle frame at the point of connection therebetween. Other suspension height increasing solutions involve fixed dimension spacers disposed between individual coils of the coil spring component of the strut assembly. In either case, the extent of the suspension height increase is predetermined by the dimension of the static spacer utilized. In many instances, the effect on vehicle ride quality due to suspension height extension is unpredictable. As a result, suspension height modifications are many times repeated in order to achieve a desired balance between suspension height and vehicle ride quality. Since the procedure for installation or removal of conventional suspension spacers is relatively time consuming, and therefore expensive, a need exists in the art for a suspension height adjustment mechanism that enables suspension height modification while in an installed condition on the vehicle suspension. There is a further need in the art to provide a vehicle suspension adjustment mechanism that can provide for a wide range of suspension height modification through a single device. It is envisioned that the apparatus of the present invention meets the needs in the art identified above.

In some cases, modification of the suspension height can negatively affect the ride quality of the vehicle, at least in part due to the resultant increased angle between the upper control arm and the knuckle at the upper ball joint. As the respective angle therebetween increases due to the increase in suspension height, the upper control arm and the knuckle together substantially create a fixed-length element that inhibits dampening of up/down movement through, for example, the strut assembly.

It is therefore another object of the present invention to provide a device to decrease the angle at the ball joint between the upper control arm and the associated knuckle in situations wherein the suspension height of the vehicle has been increased through after-market additions to original equipment, which device itself enables adjustment to wheel camber.

SUMMARY OF THE INVENTION

By means of the present invention, suspension height of a vehicle may be adjustably modified, wherein an extent of suspension height increase may be selectively adjusted in an efficient manner without suspension component disassembly. Such selective adjustment may in fact be accomplished while the suspension height adjustment apparatus, as well as its coordinating suspension componentry, remain in an installed condition. Moreover, suspension height modification may be accomplished without detrimentally affecting vehicle ride quality characteristics by maintaining a substantially original equipment geometrical arrangement subsequent to suspension height modification. The maintenance of suspension original equipment geometrical arrangement further assists in limiting excessive tire wear, and staying within safety specifications. In addition, allowance for wheel camber adjustment may be provided such that wheel camber angle may be selectively adjusted subsequent to installation of the suspension height modification component(s) of the present invention, without need for disassembly and/or replacement.

In a particular embodiment, a suspension height modification apparatus of the present invention includes a first portion that is securable to a vehicular biasing suspension device, and a second portion that is securable to a vehicular frame. The apparatus includes an axis along which a suspension height may be determined between the vehicular frame and the vehicular wheel assembly. The apparatus may be selectively extensible along the axis.

In another embodiment, an apparatus for selectively adjusting vehicular suspension height is provided, and includes a top connection plate, a bottom connection plate, and an inner adjustment member that is coupled to the top and bottom connection plates, with the inner adjustment member being selectively movable to operably increase or decrease the distance between the top and bottom connection plates.

A method for adjusting suspension height of a vehicle includes providing a suspension height adjustment apparatus that includes a movable portion that is selectively movable along a first axis, and securing the suspension height adjustment apparatus between a vehicular biasing suspension device and a vehicular frame. The suspension height adjustment is brought about by actuating the movable portion of the suspension height adjustment apparatus.

In a further embodiment, a device for adjusting control arm alignment in a vehicle includes a main body portion having an upper surface and a lower surface, and including a receptacle that is sized and configured to receive therein at least a portion of a ball joint stud that is coupled to the control arm. The device further includes an extension portion extending from the main body portion, and wherein the extension portion is specifically configured to operably couple to a knuckle associated with the control arm.

BRIEF DESCRIPTION OF THE DRAWINGS

FIG. 2 is a side view of a suspension height modification apparatus;
FIG. 3 is a cross-sectional side view of a suspension height modification apparatus;
FIG. 5B is a cross-sectional side view of a portion of a suspension height modification apparatus;
FIG. 5C is a bottom view of a portion of a suspension height modification apparatus;
FIG. 6A is a top view of a portion of a suspension height modification apparatus;
FIG. 6B is a cross-sectional side view of a portion of a suspension height modification apparatus;
FIG. 6C is a bottom view of a portion of a suspension height modification apparatus;
FIG. 7A is a top view of a portion of a suspension height modification apparatus;
FIG. 7B is a cross-sectional side view of a portion of a suspension height modification apparatus;
FIG. 7C is a bottom view of a portion of a suspension height modification apparatus;
FIG. 9A is a top view of a spacer device;
FIG. 9B is a side view of the spacer device illustrated in FIG. 9A;
FIG. 9C is a bottom view of the spacer device illustrated in FIGS. 9A and 9B;
FIG. 11 is a schematic view of a wheel assembly indicating camber adjustment;
FIG. 12A is a schematic view of a wheel assembly;
FIG. 12B is a top view of a spacer device orientation;
FIG. 12C is a top view of a spacer device orientation.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various embodiments of the invention. Other embodiments and aspects of the invention are recognized as being within the grasp of those having ordinary skill in the art.

Figure 1:
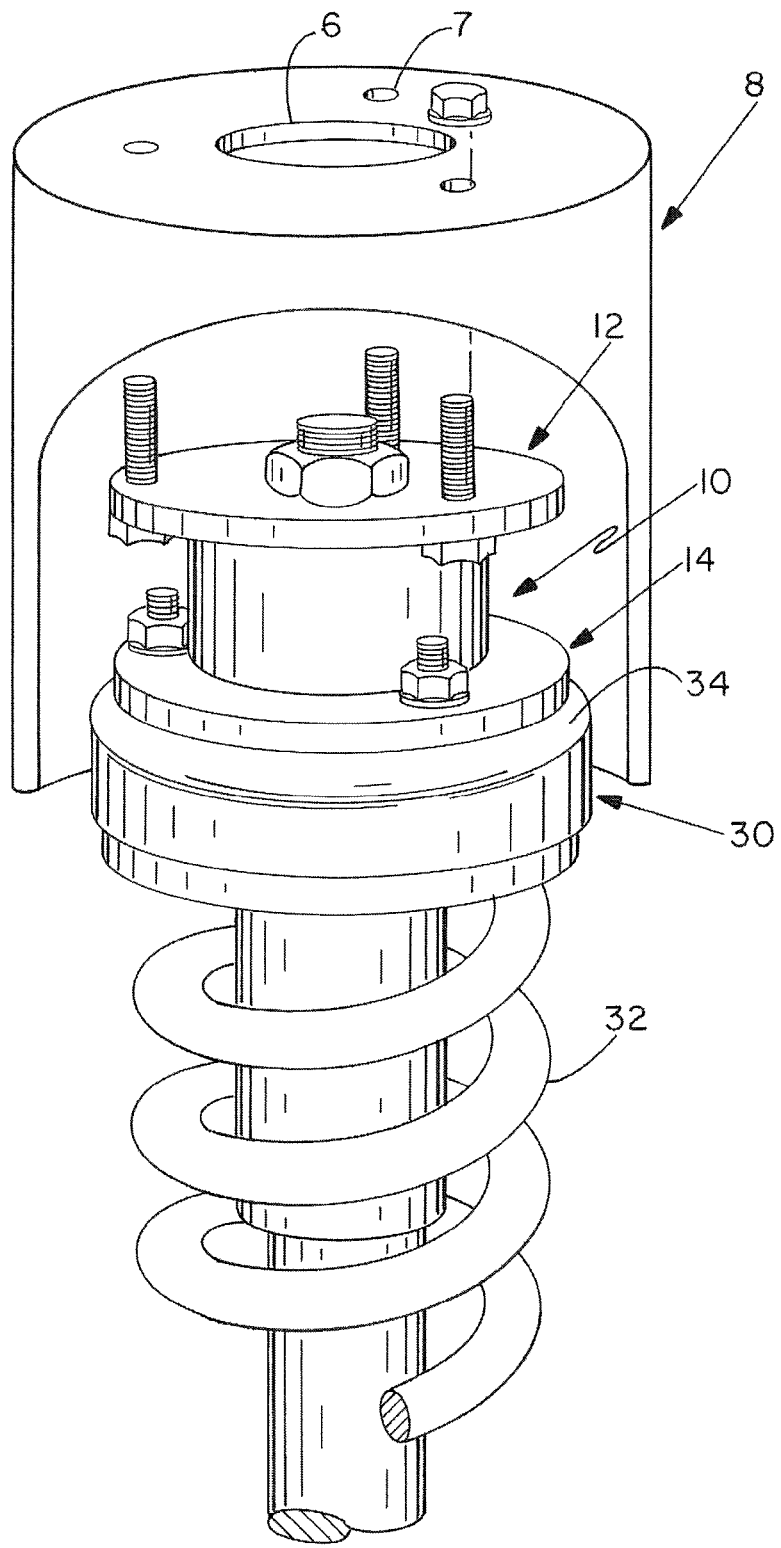
FIG. 1 is a schematic view of a suspension height modification apparatus.
Figure 4:
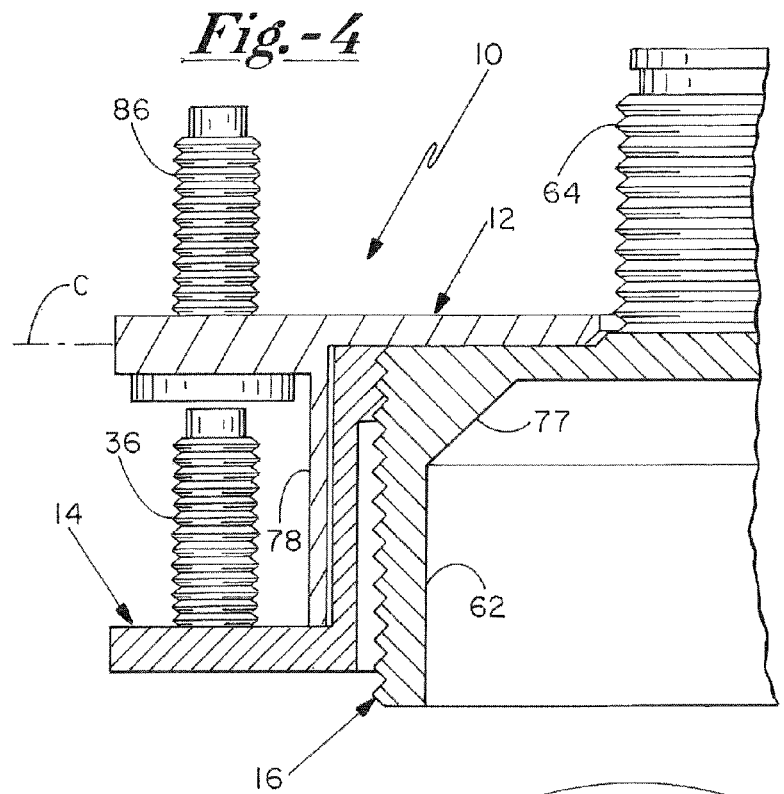
FIG. 4 is a partial cross-sectional view of a suspension height modification apparatus.

With reference now to the drawings, and first to FIG. 1, an adjustable suspension height modification apparatus 10 is illustrated in an arrangement mounted to upper end 34 of strut assembly 30. Through such an orientation, apparatus 10 may act as a spacer between upper end 34 of strut assembly 30 and the associated vehicle frame 8. As shown in the assembly views of FIGS. 1-4, apparatus 10 includes a top connection plate 12, a bottom connection plate 14, and an inner adjustment member 16, which adjusts any separation between top and bottom connection plates 12, 14. Such adjustable separation of top and bottom plates 12, 14 effectuates the adjustable height modification characteristic of apparatus 10 of the present invention.

As illustrated in FIGS. 1 and 2, bottom connection plate 14 may be secured to strut assembly 30 at, for example, bolts 36 of strut assembly 30. In such a manner, apparatus 10 may be securable to strut assembly 30 in a like manner as strut assembly 30 conventionally affixes to vehicular frame 8, wherein, in the absence of apparatus 10, strut assembly 30 may be affixed to vehicular frame 8 via bolts 36 extending at least partially through respective apertures 7 in the frame, and the bolts 36 fixed in place thereat through, for example, appropriately configured nuts. As a consequence, strut assembly 30 need not be modified in order to secure apparatus 10 thereto. Specifically, bolts 36 of strut assembly 30 extend through corresponding apertures 52 of bottom connection plate 14 (see FIG. 5A). Apparatus 10 may then be secured in place through, for example, nuts 38 threaded upon respective bolts 36.

Figure 5A:
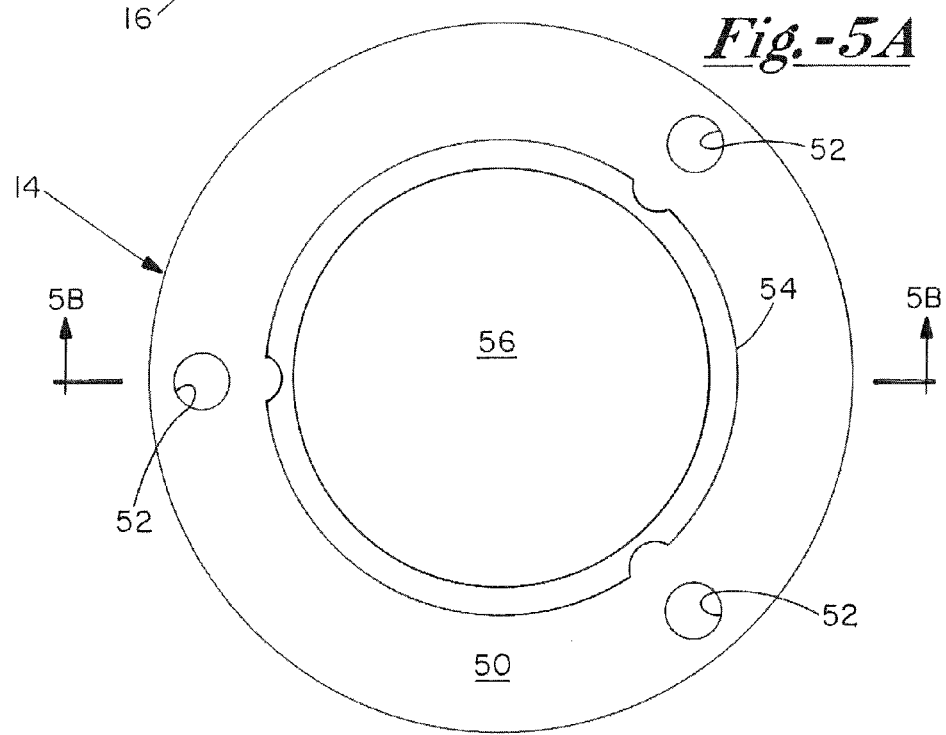
FIG. 5A is a top view of a portion of a suspension height modification apparatus.

One embodiment of bottom connection plate 14 is illustrated in isolation view in FIGS. 5A-5C, with FIGS. 5A and 5C showing upper and lower views of bottom plate 14, respectively. In the illustrated embodiment, bottom connection plate 14 includes a mounting portion 50 and an adjustment member engagement portion 54. Apertures 52 are preferably disposed in mounting portion 50 in a predetermined configuration to permit engagement of bolts 36 through apertures 52. Adjustment member engagement portion 54 may be disposed about an axial aperture 56 in bottom connection plate 14. In the illustrated embodiments, at least a portion of adjustment member engagement portion 54 is threaded to threadably engage with inner adjustment member 16. An example threaded portion 58 of adjustment member engagement portion 54 is illustrated in FIG. 5B.

Inner adjustment member 16 is illustrated in isolation view in FIGS. 6A-6C, with FIGS. 6A and 6C showing upper and lower views of inner adjustment member 16, respectively. In the illustrated embodiment, inner adjustment member 16 is a unitary structure having a first engagement portion 62 and a second engagement portion 64. First engagement portion 62 may, for example, be threaded, and may in particular be threaded in a manner to threadably engage with threaded portion 58 of bottom connection plate 14. Accordingly, in the embodiment illustrated in the drawings, an outer surface of first engagement portion 62 engages with adjustment member engagement portion 54 of bottom connection plate 14 at axial aperture 56 thereof. In one embodiment, outer diameter $D_1$ is substantially similar to, but slightly smaller than, diameter $D_2$ of axial aperture 56, such that first engagement portion 62 is permitted to engage with adjustment member engagement portion 54 within axial aperture 56.

In some embodiments, adjustment member engagement portion 54 of bottom connection plate 14 extends above first plane "A" of mounting portion 50, and may so extend perpendicularly from mounting portion 50. Such extension of adjustment member engagement portion 54 may be provided to accommodate at least a portion of height $H_1$ of first engagement portion 62 within axial aperture 56. In some embodiments, height $H_1$ is less than or equal to height $H_2$ of bottom connection plate 14. In this manner, first engagement portion 62 of inner adjustment member 16 is provided with a full engagement height that does not, in operation, require extension below a plane containing lower surface 51 of bottom connection plate 14, thereby avoiding interference with strut assembly 30.

In some embodiments, inner adjustment member 16 is provided with a first axial opening 66 having a diameter $D_3$ that is greater than an outer diameter $D_4$ of upper portion 32 of strut assembly 30. In this manner, a portion of inner adjustment member 16 may be operably disposed over and about upper portion 32 of strut assembly 30.

As best illustrated in FIGS. 6A and 6C, inner adjustment member 16 may further include a second axial opening 68 in second engagement portion 64. Second axial opening 68 may extend axially through at least a portion of second engagement portion 64. In some embodiments, second axial opening 68 is configured to receive a projection from a wrench, or other tool, such as a rotation-inducing tool to assist in manipulating inner adjustment member 16 with respect to bottom connection plate 14. In the illustrated embodiment, a tool may be utilized to induce rotation of inner adjustment member 16 with respect to bottom connection plate 14, which bottom connection plate 14 may be maintained in a rotationally stationary orientation with respect to inner adjustment member 16 through the engagement of bolts 36 through respective apertures 52 therein. In the illustrated embodiment, second axial opening 68 has a substantially square cross-section. Other cross-section configurations for second axial opening 68, however, are contemplated by the present invention. Moreover, other features, such as projections or the like may be utilized in place of, or in addition to, axial opening 68 for selective coupling thereto by a tool.

In some embodiments, a transition portion 69 is provided on inner adjustment member 16 between first engagement portion 62 and second engagement portion 64. Transition portion 69 may have a tapered profile as illustrated in FIGS. 3 and 6B to enable rotatable engagement with top connection plate 12. The tapered surface of transition portion 69 assists in minimizing frictional forces created at the junction of inner adjustment member 16 and top connection plate 12, thereby facilitating relative rotational movement therebetween. Such tapered configuration of transition portion 69 further assists in properly seating top connection plate 12 about second engagement portion 64 of inner adjustment member 16.

Though inner adjustment member 16 is described above and depicted in the drawings as being threadably engageable with top and bottom connection plates 12, 14, it is contemplated that other mechanisms of engagement are contemplated. For example, inner adjustment member 16 may be coupled to top and bottom connection plates 12, 14, either fixedly or otherwise, and itself be axially extendable along axis "B". Example mechanisms for obtaining axial extendibility of inner adjustment member 16 include worm gears, screw drives, ratchet systems, and the like. Applicants contemplate, therefore, that apparatus 10 may be provided in a variety of combinations, with a common characteristic being that height dimension $H_4$ of apparatus 10 is selectively modifiable. In some embodiments, the selective modification of height dimension $H_4$ may be effectuated while apparatus 10 is in a fully installed condition. In some embodiments, the selective modification of height dimension $H_4$ may be accomplished without disassembly of strut assembly 30, such as removal of spring 32 from strut assembly 30. Height dimension $H_4$ may be adjusted, for example, from between about 0.5 to about 5 inches.

Top connection plate 12 of apparatus 10 is illustrated in isolation view in FIGS. 7A-7C, with upper and lower views of top connection plate 12 being shown in FIGS. 7A and 7C, respectively. Top connection plate 12 preferably includes mounting apertures 72 for receiving mounting bolts 86 therethrough. Mounting bolts 86 are further illustrated in FIG. 2 as taking the place of bolts 36 in coupling apparatus 10 and strut assembly 30 to the vehicle frame, wherein in the absence of apparatus 10, original equipment of strut assembly 30, such as bolts 36, would be used to couple strut assembly 30 to vehicle frame 8. Accordingly, mounting apertures 72 may be positioned in top connection plate 12 in a predetermined pattern appropriate to accommodate the original mounting arrangement of the mounting features of strut assembly 30, such as bolts 36, which are useful in mounting strut assembly 30 to vehicular frame 8 in the absence of apparatus 10. Top connection plate 12 may further include an aperture 74 that is dimensioned to have a perimeter 75 that may be operably disposed about second engagement portion 64 of inner adjustment member 16. In particular, aperture 74 may have a diameter $D_5$ that is somewhat greater than the outer diameter $D_6$ of second engagement portion 64.

Top connection plate 12 may be operably disposed upon bearing surface 57 of inner adjustment member 16, and may be seated thereupon at tapered portion 77, which may be in operable juxtaposition with tapered surface 69 of inner adjustment member 16. In such a manner, top connection plate 12 is axially displaced along axis (B) through axial movement of inner adjustment member 16, which, in some embodiments, is brought about by rotational movement of inner adjustment member 16 with respect to bottom connection plate 14. Because lower end 31 of strut assembly is operably secured to a vehicle wheel assembly (not shown), the selective modification of dimension $H_4$ through axial movement of at least a portion of apparatus 10 (such as inner adjustment member 16) with respect to bottom plate 14 results in a modification of the height separation between vehicle frame 8 and the associated vehicle wheel assembly. In the event that dimension $H_4$ of apparatus 10 is selectively increased through the operation described above, top connection plate 12 transmits force to vehicle frame 8 to effectuate a desired degree of raising thereof relative to the associated vehicle wheel assembly.

In some embodiments of apparatus 10, top connection plate 12 further includes a shield portion 78 extending outwardly from plane "C" of top connection plate 12, and preferably perpendicularly outwardly therefrom. In operation, shield portion 78 depends downwardly from the remainder of top connection plate 12 concentrically about engagement portion 54 of bottom connection plate 14. In such a manner, shield portion 78 alone, or in combination with engagement portion 54, prevents infiltration of dirt or other debris to the engagement mechanism (such as engaging threads) between bottom connection plate 14 and inner adjustment member 16.

As illustrated in FIGS. 2 and 3, a lock nut 92 or other mechanism may be provided to selectively lockingly secure the combination of top connection plate 12 and inner adjustment member 16 at a desired axial position relative to bottom connection plate 14 along axis B. In one embodiment, lock nut 92 threadably engages with second engagement portion 64 of inner adjustment member 16 to an extent at which lock nut 92 engages, or causes another element to engage, upper surface 13 of top connection plate 12. Such engagement arrests the freedom to rotate inner adjustment member 16 relative to bottom connection plate 14, and thus arrests change in axial separation between top and bottom connection plates 12, 14. Those of ordinary skill in the art, however, may readily understand and perceive alternative mechanisms for achieving such a selective locking characteristic of the axial separation between top and bottom connection plates 12, 14 in apparatus 10.

Due to the high loads and stresses that may be placed upon apparatus 10 in operation, it is desired that apparatus 10 be manufactured of strong and durable materials, such as, for example, stainless steel or high-nickel steel. Other materials, however, may be utilized in the fabrication of apparatus 10, so long as such materials exhibit adequate strength and durability properties desired by the end user and/or by the manufacturer.

Apparatus 10 of the present invention, as described above, provides selective adjustment of suspension height (as defined between vehicle frame 8 and the associated vehicle wheel assemblies) while apparatus 10 is in a mounted, operating condition, such as, for example, between strut assembly 30 and vehicle frame 8. Moreover, such selective adjustment may take place without disassembly of strut assembly 30, including without removal of spring 32 from strut assembly 30. In some embodiments, the selective adjustment may enable a range of up to about 5 inches of added suspension height. Such a range, however, may be modified as desired per application. In particular, certain embodiments of apparatus 10 may provide more or less suspension height adjustment than described above.

In one embodiment, apparatus 10 may be mounted to a vehicle by first removing strut assembly 30 from its connection to the vehicle frame. Bottom connection plate 14 is then secured to upper portion 32 of strut assembly 30, as described above. Top connection plate 12 of apparatus 10 is then secured to vehicle frame 8 via mounting bolts 86 in a manner similar to the process for mounting upper portion 32 of strut assembly 30 to the vehicle frame 8. Once both top and bottom connection plates 12, 14 are secured in place, adjustment to the extent desired of suspension height modification may be made by coupling a wrench or other appropriate tool to second axial opening 68 of inner adjustment member 16. Such second axial opening 68 is accessible to a wrench or other tool while apparatus 10 is in an installed condition, such that suspension height adjustment may be accomplished without having to remove apparatus 10 from its securely mounted condition. In one embodiment, axial opening 68 is accessible to a tool through an opening 6 in vehicle frame 8 that is located axially above opening 68 when apparatus is in a mounted position. Such vehicle frame opening 6 is typically provided as original equipment in certain vehicles. Accordingly, in order to effectuate suspension height adjustment while apparatus 10 is in an installed condition, an operator need only rotate inner adjustment member 16 in an appropriate direction through manipulation of a tool coupled to inner adjustment member 16 at an actuation feature such as second axial opening 68. The adjustment technique described above, therefore, substantially reduces time and expense in adjusting, or re-adjusting suspension height once apparatus 10 has been installed. As described above, conventional devices require removal and re-installation of the entire strut assembly and spacer device in order to effectuate a modification of suspension height adjustment. Apparatus 10 of the present invention eliminates such a necessity.

Though apparatus 10 is described above with reference to the illustrated embodiments and in connection with a strut assembly 30, it is contemplated by the Applicant that apparatus 10 may be useful in connection with a variety of biasing suspension devices. For example, apparatus 10 may be used in connection with a spring assembly, wherein the spring is not positioned about a shock absorber. Such a spring assembly may be in the form of, for example, a coil spring, a leaf spring, or other configurations. An important purpose of apparatus 10, therefore, is to effectuate adjustable vehicle suspension height modification by adjustably "adding to" the height dimension of a vehicular biasing suspension device. For the purposes of this application, the term "biasing suspension device" is intended to mean a device, apparatus, or assembly which exerts a bias force against the vehicle frame in order to suspend such frame from and/or above the associated wheel assembly of the vehicle. The term "biasing suspension device" is intended to include, but is not intended to be limited to, strut assemblies and spring assemblies. For the purposes of this application, the term "wheel assemblies" is intended to include the structure associated with the connection of a wheel to a vehicle, and specifically includes, but is not limited to, axles, steering rods, lower control arms, and the like.

It is another aspect of the present invention that apparatus 10 be useful in connection with original suspension equipment supplied with the vehicle from the manufacturer. Though apparatus 10 may additionally be useful in aftermarket products, it is specifically envisioned that apparatus 10 be adaptable to original vehicle equipment. For example, apparatus 10 may be specifically configured to be operably connectable to the strut assembly originally supplied with a particular make, model, and model year automobile. In this manner, apparatus 10 may represent merely an "add-on" device that may be installed on a vehicle without need for replacement or modification of existing vehicle parts.

Figure 8:
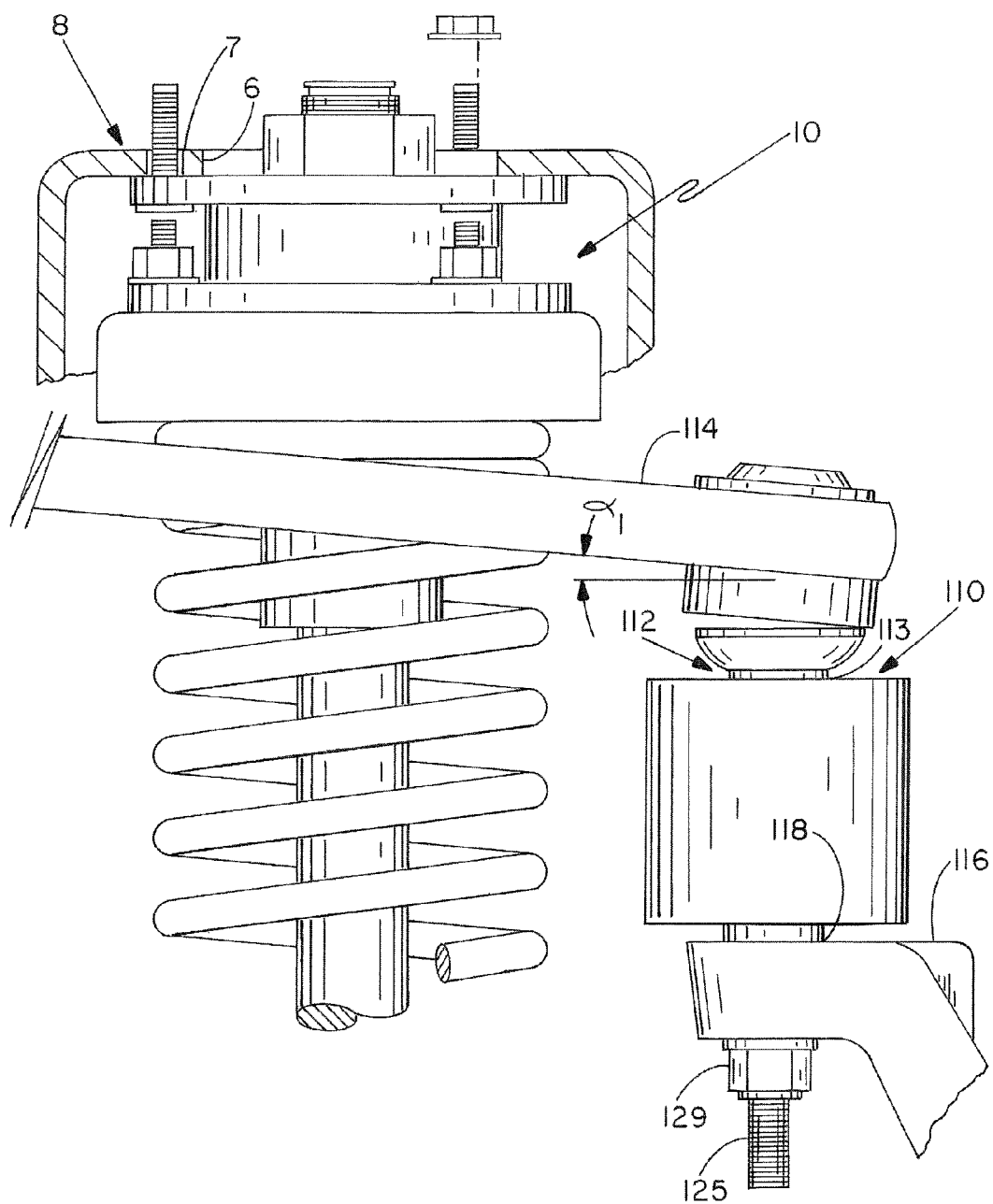
FIG. 8 is a schematic view of an installed suspension height modification system.

A further aspect of the present invention is illustrated in FIGS. 8-9, wherein spacer device 110 is shown acting as a spacer element at upper ball joint 112 between upper control arm 114 and knuckle 116. In many applications, particularly those in which the suspension height of a vehicle has been substantially increased through the use of suspension height modifying devices installed subsequent to vehicle manufacture, the representative angle from horizontal of the upper control arm is typically correspondingly increased as well. As described above, such increase in angle of the upper control arm may have undesired effects on the ride quality of the vehicle. As a consequence, spacer device 110 separates upper control arm 114 from the corresponding knuckle 116 to decrease the angle from horizontal of upper control arm 114, and thus improve vehicle ride quality.

Spacer device 110 includes a main body portion 122 and an extension portion 124 extending from main body portion 122. In order to operably receive stud 113 of upper ball joint 112, spacer device 110 may include a ball joint stud receptacle 130 disposed in upper surface 126 of main body portion 122. Ball joint stud receptacle 130 may be sized and configured to operably receive therein at least a portion of stud 113 of ball joint 112. Moreover, ball joint stud receptacle 130 may extend through height dimension $H_3$ of spacer device 110 in order to allow for a retention device, such as a nut, to secure stud 113 within ball joint stud receptacle 130. In such a manner, the retention device may be installed upon a lower portion of stud 113 through opening 131 at bottom surface 123 as spacer device 110.

To effectuate proper connection between spacer device 110 and knuckle 116, extension portion 124 may be configured similarly to stud 113 of upper ball joint 112, including, for example, threaded portion 125. In such a manner, at least a portion of extension portion 124 of spacer device 110 may be securely received in a corresponding aperture or receptacle 118 of knuckle 116, and secured thereto with a retention device, such as nut 129.

Figure 10:
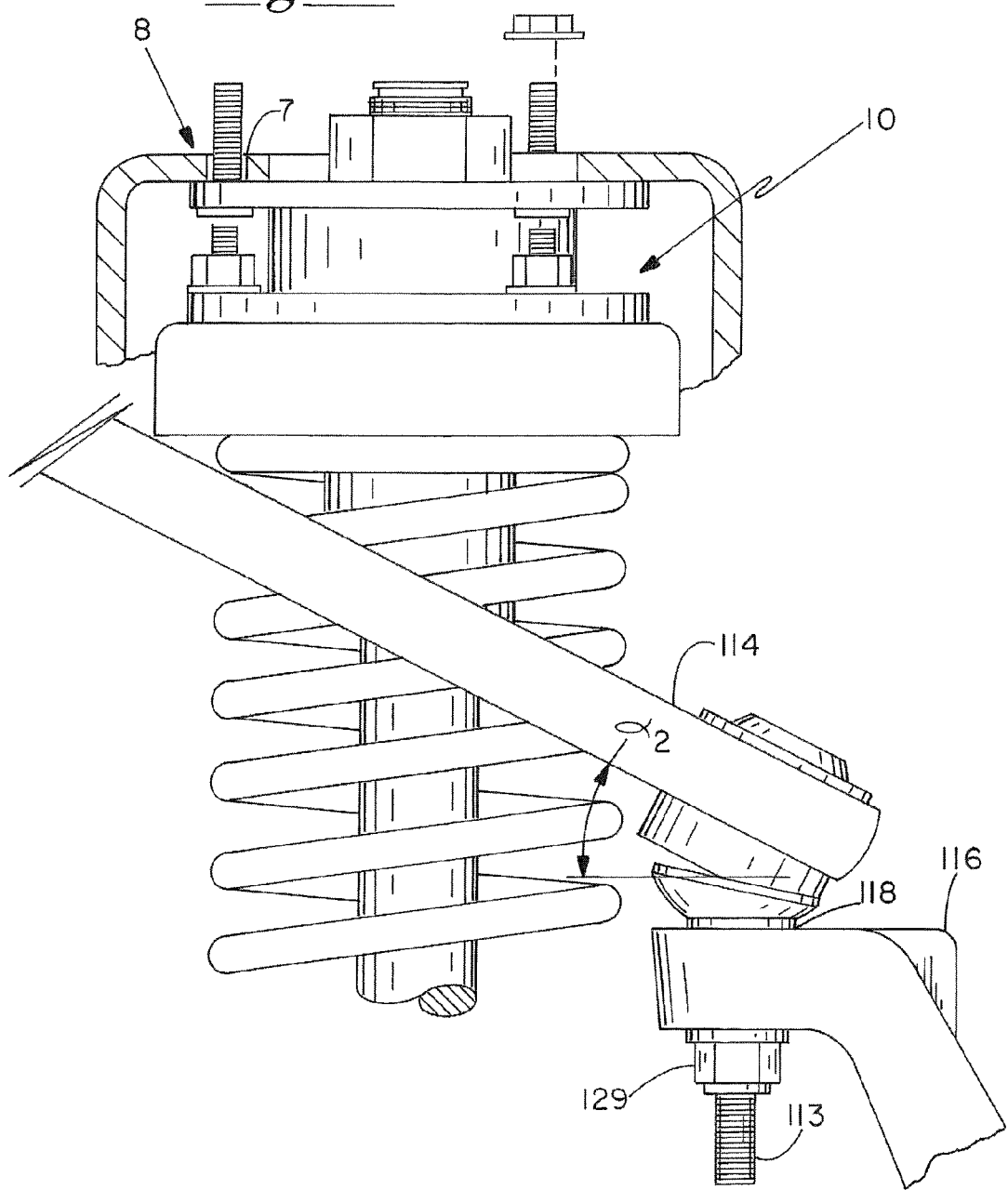
FIG. 10 is a schematic view of a suspension height modification arrangement.

In view of the above, height dimension $H_3$ of spacer device 110 forms a predetermined separation adjustment dimension between upper control arm 114 and knuckle 116, such as in a double wishbone-type suspension. It is contemplated that spacer device 110 may be fabricated in a variety of height dimensions $H_3$, as desired per application. In some embodiments, height dimension $H_3$ of spacer device 110 may be between about 0.5 and 5 inches, The relationship of the presence of spacer device 110 to the angle from horizontal of upper control arm 114 is illustrated in FIGS. 8 and 10, with FIG. 8 showing a representative angle $\alpha_1$ from horizontal of upper control arm 114 when upper control arm 114 is coupled to knuckle 116 via spacer device 110 in a situation wherein a suspension height modification device, such as apparatus 10, has been installed. The arrangement illustrated in FIG. 8 is contrasted with that shown in FIG. 10, wherein upper control arm 114 is directly coupled to knuckle 116 at upper ball joint 112 in a situation wherein a suspension height adjustment device, such as apparatus 10, has been installed. FIG. 10 clearly demonstrates that the angle from horizontal $\alpha_2$ in the absence of spacer device 110 is substantially greater than $\alpha_1$, as shown in FIG. 8. As described above, such an increased angle can be detrimental to ride quality characteristics of the vehicle.

Moreover, due to the fact that both upper control arm 114 and knuckle 116 are typically of fixed length in original vehicle equipment, the addition of a suspension height modification device, such as apparatus 10, may cause upper ball joint 112 to be operably brought in closer proximity to, for example, the associated strut assembly. Depending upon the particular vehicle arrangement, and the extent to which the suspension height has been increased, upper ball joint 112 may, in the absence of spacer device 110, undesirably contact the associated biasing suspension device, and may potentially detrimentally affect the operation of such biasing suspension device. The addition of spacer device 110, therefore, reduces the operable angle from horizontal of upper control arm 114, and therefore increases the distance between upper ball joint 112 and the associated biasing suspension device. Of course, it is to be understood that the angle from horizontal of upper control arm 114 is not static in operation, but in fact changes significantly through the incursion and removal of upward forces on the associated wheel assembly due to operation of the vehicle.

A further aspect of spacer device 110 is the offset characteristic of at least one of extension portion 124 and ball joint stud receptacle 130 from central axis "E". In the illustrated embodiment, receptacle axis "D" of ball joint stud receptacle 130 is offset by dimension $X_1$ from central axis "E" of spacer device 110. Moreover, extension axis "F" of extension portion 124 is offset by dimension $X_2$ from axis "E". The offsets described above enable spacer device 110 to adjust camber of the associated wheel assembly through measured rotation of spacer device 110.

Due to the fact that upper control arm 114 is anchored to the vehicle frame, and that at least a portion of the wheel assembly is pivotable in all directions about a lower ball joint (not shown), rotation of spacer device 110 occurs effectively about receptacle axis "D". The offset nature of extension axis "F" from receptacle axis "D" results in extension portion 124 effecting a displacement force on the wheel assembly via knuckle 116 during rotation of spacer device 110 while in an installed condition. Depending upon the dimensions of $X_1$ and $X_2$, spacer device 110 can provide a selected degree of camber adjustment. In one embodiment, such camber adjustment is up to about 6 degrees. Other extents of adjustment, however, are envisioned by the present invention, through various degrees of offset, and/or through various dimensions of spacer device 110. For example, dimensions $X_1$ and $X_2$ may be between about 0.25 and about 1.0 inches, and may be unevenly displaced from central axis "E".

FIG. 11 illustrates wheel camber adjustment, wherein wheel 150 is, for example, a left front wheel of an automobile, with the front of such automobile being oriented into the page. As illustrated in FIG. 11, a positive wheel camber orients a lower portion 152 of wheel 150 toward the vehicle, while a negative camber setting adjusts lower portion 152 away from the vehicle. A "zero" camber setting is represented by vertical axis 154.

Figure 12D:
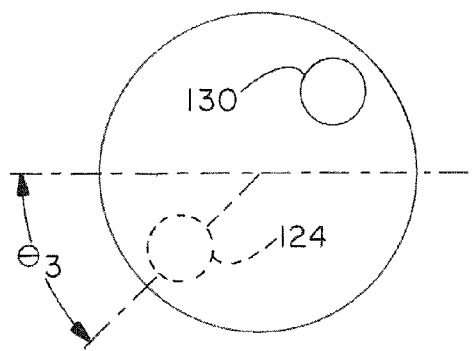
FIG. 12D is a top view of a spacer device orientation.
Figure 12E:
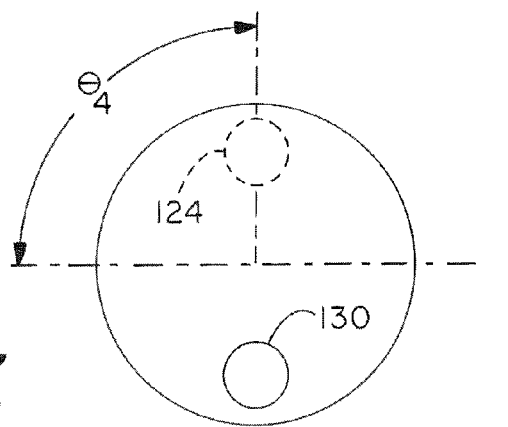
FIG. 12E is a top view of a spacer device orientation.
Figure 12F:
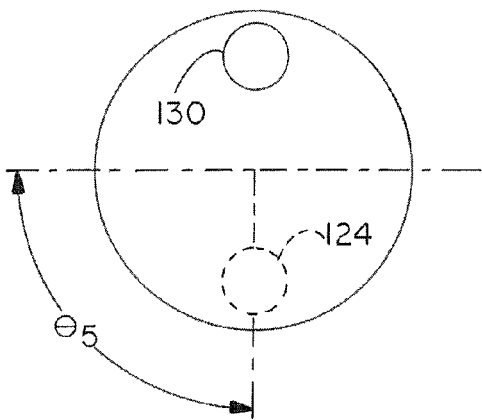
FIG. 12F is a top view of a spacer device orientation.
Figure 12G:
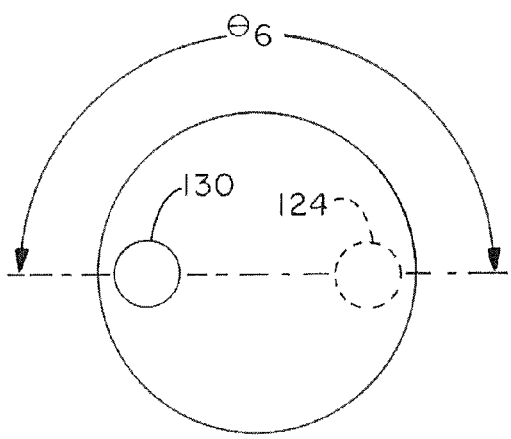
FIG. 12G is a top view of a spacer device orientation.

The process of wheel camber adjustment through spacer device 110 is illustrated in FIGS. 12A-12G. FIG. 12A demonstrates a vehicular orientation of spacer device 110 as a reference for the rotational orientations of spacer device 110 illustrated in FIGS. 12B-12G. In particular, and for the purposes of demonstration only, spacer device 110 is illustrated in the top view of FIG. 12A in connection with a left front wheel assembly of a vehicle, with the front of the vehicle being depicted by the directional arrow. The top view of FIG. 12A schematically illustrates spacer device 110 installed between upper control arm 114 and the knuckle (not shown). Rotation of spacer device 110 about axis "D" at ball joint receptacle 130 causes extension portion 124 to "push" or "pull" on knuckle 116 to thereby adjust the camber setting of wheel assembly 160. In one embodiment, rotation of spacer device 110 generally about axis "D" to position extension portion 124 in a location most outboard from the vehicle results in the greatest extent of positive camber adjustment available. By contrast, rotation of spacer device 110 generally about axis "D" to position extension portion 124 in a location most inboard toward the vehicle results in the greatest extent of negative camber adjustment available. Such adjustment comes about through the "pushing" or "pulling" of knuckle 116, which, consequently, "pushes" or "pulls" an upper portion 156 of wheel 150 about a lower ball joint pivot connection. The resultant wheel assembly pivot action generally occurs along an arc substantially contained in a vertical plane 162 intersecting the lower ball joint.

FIGS. 12B-12G represent various rotational orientations for spacer device 110 substantially about axis "D". The following Table 1 provides numerical camber angle measurements taken on a 2005 Ford F-150 4×4 "Super Crew" vehicle having spacer device 110 and adjustable suspension height modification apparatus 10 installed at a left front wheel assembly thereof. The particular spacer device 110 used for the data reflected in Table 1 had a height dimension $H_3$ of 2.38 inches, a dimension $X_1$ of 0.625 inches, and a dimension $X_2$ of 0.625 inches. The suspension height modification apparatus 10 installed in the vehicle for testing of camber adjustment was set to a $H_4$ of 1.625 inches.

TABLE 1

| Figure | Rotational Angle (θ) | Camber Angle (degrees) |
| --- | --- | --- |
| 12B | $\theta_1 = 0°$ | 2.80 |
| 12C | $\theta_2 = 45°$ | 1.09 |
| 12D | $\theta_3 = -45°$ | 1.89 |
| 12E | $\theta_4 = 90°$ | -0.44 |
| 12F | $\theta_5 = -90°$ | -1.34 |
| 12G | $\theta_6 = 180°$ | -3.21 |

As shown in the above Table 1, one embodiment of spacer device 110 provides for about 6 degrees of camber adjustment, depending upon the rotational orientation of spacer device 110 about axis "D". In addition to the camber adjustment capability of spacer device 110, it has been found by the Applicants that the mere presence of spacer device 110 at upper ball joint 112 can recover the "lost camber" incurred in installing a suspension height lift device. The "lost camber" effect is due primarily to the geometrical constraints illustrated in FIG. 10, wherein the increased angle of upper control arm 114 acts to draw inboard knuckle 116 at upper ball joint 112. By drawing knuckle 116 inboard toward the vehicle, a potentially undesired negative camber adjustment is realized.

As with suspension height adjustment apparatus 10, spacer device 110 may be specifically designed to be utilized in connection with original equipment supplied with the vehicle. For instance, ball joint stud receptacle 130 may be specifically configured to receive an original equipment ball joint stud 113 of upper control arm 114, while extension portion 124 may be specifically configured to be operably received in an associated receptacle in knuckle 116. It is also understood by the Applicant that configurations for spacer device 110 may necessarily be modified in order to comply with original equipment specifications on various vehicles. In addition to the "lost camber" recovery characteristic described above, spacer device 110 enables wheel camber alignment tuning in a simple process, and without any disassembly. Specifically, wheel camber tuning may be accomplished with spacer device 110 in an installed condition by simply rotating spacer device 110 about axis "D" with a wrench or similar tool. Spacer device 110 may include one or more substantially flat side surfaces 127 so as to facilitate coupling thereto by such an appropriate tool for rotating spacer device 110. In some cases, the "taper" or "seat" of the upper ball joint stud in ball joint stud receptacle 130 and/or of extension portion 124 in the associated receptacle of knuckle 116 needs to be "broken" prior to rotation of spacer device 110. However, such a procedure is simple, and is well understood by those of ordinary skill in the art.

Spacer device 110 is preferably fabricated from a relatively strong and durable material, such as stainless steel.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different methods/devices and that various modifications can be accomplished without departing from the scope of the invention itself.

What is claimed is:

1. An apparatus for use in a vehicle suspension, said apparatus comprising:
   (a) a suspension height modification device having:
      (i) a first portion securable to a vehicular biasing suspension device;
      (ii) a second portion securable to a vehicular frame; and
      (iii) a third portion that is operably movable with respect to at least one of said first and second portions so as to selectively increase or decrease a distance between said first and second portions; and
   (b) a spacer device having:
      (i) a main body portion with a first central axis;
      (ii) a first coupling feature having a second coupling axis that is radially displaced in a first direction from said first central axis; and
      (iii) a second coupling feature having a third coupling axis that is radially displaced in a second direction from said first central axis.

2. An apparatus as in claim 1 wherein said first coupling feature is specifically configured to operably receive at least a portion of an upper ball joint stud.

3. An apparatus as in claim 1 wherein said second coupling feature is specifically configured to be at least partially operably received in a knuckle receptacle.

4. An apparatus as in claim 1 wherein said third portion is selectively movable along an axis along which a suspension height may be determined between said vehicular frame and a vehicular wheel assembly.

5. An apparatus as in claim 1 wherein said first and second coupling axes are substantially parallel to said first central axis.

6. An apparatus as in claim 1 wherein said first radial direction is substantially opposite from said second radial direction.

7. A method for modifying suspension height in a vehicle, said method comprising:
   (a) providing a suspension height adjustment device having a movable portion that is selectively movable along a first axis;
   (b) providing a spacer device having:
      (i) a main body portion having an upper surface and a lower surface, and a height defined between said upper and lower surfaces;
      (ii) a first central axis along said height;
      (iii) a first coupling feature having a second coupling axis that is displaced radially in a first direction from said first central axis; and
      (iv) a second coupling feature having a third coupling axis that is displaced radially in a second direction from said first central axis;
   (c) disengaging a vehicle biasing suspension device from an associated vehicle frame;
   (d) coupling said suspension height adjustment device to said vehicle biasing suspension device;
   (e) coupling said suspension height adjustment device to said associated vehicular frame;
   (f) operably connecting an upper control arm of the vehicle to said spacer device via said first coupling feature; and
   (g) operably connecting a knuckle of the vehicle to said spacer device via said second coupling feature.

8. A method as in claim 7, including actuating said movable portion of said suspension height adjustment device.

9. A method as in claim 7, including adjusting camber of a wheel associated with said suspension by rotating said spacer device about said second coupling axis.

* * * * *